US012782117B2

(12) United States Patent
Weber

(10) Patent No.: US 12,782,117 B2
(45) Date of Patent: Nov. 3, 2026

(54) METHOD FOR OPTICALLY MEASURING TECHNICAL SURFACES, AND DEVICE FOR CARRYING OUT THE METHOD

(71) Applicant: Breitmeier Messtechnik GmbH, Ettlingen (DE)

(72) Inventor: Mark Alexander Weber, Neukirchen-Vluyn (DE)

(73) Assignee: Breitmeier Messtechnik GmbH, Ettlingen (DE)

( * ) Notice: Subject to any disclaimer, the term of this patent is extended or adjusted under 35 U.S.C. 154(b) by 134 days.

(21) Appl. No.: 18/706,056

(22) PCT Filed: Oct. 20, 2022

(86) PCT No.: PCT/EP2022/079294
§ 371 (c)(1),
(2) Date: Apr. 30, 2024

(87) PCT Pub. No.: WO2023/078690
PCT Pub. Date: May 11, 2023

(65) Prior Publication Data

US 2025/0012564 A1 Jan. 9, 2025

(30) Foreign Application Priority Data

Nov. 2, 2021 (DE) ..................... 10 2021 128 444.9

(51) Int. Cl.
*G01B 11/24* (2006.01)
*G01B 11/30* (2006.01)
*G02B 21/00* (2006.01)

(52) U.S. Cl.
CPC .............. *G01B 11/24* (2013.01); *G01B 11/30* (2013.01); *G02B 21/0032* (2013.01); *G02B 21/006* (2013.01)

(58) Field of Classification Search
CPC ............ G02B 21/0032; G02B 21/0024; G02B 21/0028; G02B 21/0036; G02B 21/004;
(Continued)

(56) References Cited

U.S. PATENT DOCUMENTS 4,806,004 A * 2/1989 Wayland ............ G01N 21/6458 359/368
5,260,826 A * 11/1993 Wu ...................... G02B 21/004 359/383
(Continued)

FOREIGN PATENT DOCUMENTS

CN 106908942 A * 6/2017 ........... G02B 21/365
CN 107678151 B * 4/2020 ......... G02B 21/0036
(Continued)

OTHER PUBLICATIONS

Hillenbrand, Matthias et al., "Parallelized chromatic confocal systems enable efficient spectral information coding," SPIE Newsroom 10.1117/2.1201301.004642, pp. 1-3. (Year: 2013).*
(Continued)

*Primary Examiner* — Gordon J Stock, Jr.
(74) *Attorney, Agent, or Firm* — Collard & Roe, P.C.

(57) ABSTRACT

In a method for optically measuring technical surfaces using a confocal sensor, light is directed onto a sample surface to be measured via an optical system that contains an illumination mask, a sensor matrix, a beam splitter for combining illumination beam and detection beam paths, and imaging optics. The mask has transparent and non-transparent or slightly transparent regions arranged in a checkerboard pattern. The pitch of the mask pattern corresponds to the pixel pitch of the matrix. The mask and the matrix are adjusted relative to each other such that the transparent regions and the pixels of the matrix are simultaneously sharply imaged onto the sample by the imaging optics, whereby the sharp image of the mask is then sharply imaged
(Continued)

onto the matrix so that a checkerboard pattern of light and dark illuminated pixels is produced on the matrix. The transparent regions of the mask are round.

9 Claims, 6 Drawing Sheets

(58) Field of Classification Search
CPC .. G02B 21/0044; G02B 21/006; G01B 11/24; G01B 11/25; G01B 11/2513; G01B 11/167; G01B 11/22; G01B 11/254; G01B 11/30; G01B 11/303; G01B 11/306
See application file for complete search history.

(56) References Cited

U.S. PATENT DOCUMENTS

| | | | | |
|---|---|---|---|---|
| 6,229,913 | B1 | 5/2001 | Nayar et al. | |
| 6,252,717 | B1 * | 6/2001 | Grosskopf | G02B 21/002 250/234 |
| 7,209,287 | B2 * | 4/2007 | Lauer | G02B 21/004 359/368 |
| 9,757,216 | B2 * | 9/2017 | Wewer | A61B 1/24 |
| 9,860,520 | B2 * | 1/2018 | Michaeli | A61B 1/247 |
| 10,588,494 | B2 | 3/2020 | Thiel et al. | |
| 2003/0085335 | A1 * | 5/2003 | Almogy | G01N 21/9501 250/208.1 |
| 2010/0053630 | A1 * | 3/2010 | Oota | G01B 9/02057 356/243.4 |
| 2010/0099984 | A1 * | 4/2010 | Graser | G02B 21/0032 356/610 |
| 2018/0157022 | A1 * | 6/2018 | Lytle | G01N 21/6458 |
| 2020/0116988 | A1 * | 4/2020 | Luo | G02B 21/0064 |
| 2020/0240774 | A1 * | 7/2020 | Kim | G01B 11/002 |
| 2021/0124161 | A1 * | 4/2021 | Montes Usategui | G02B 21/0036 |
| 2021/0373313 | A1 * | 12/2021 | Sandkuijl | G02B 21/0032 |
| 2022/0291494 | A1 * | 9/2022 | Kei | G02B 27/0961 |
| 2024/0045188 | A1 * | 2/2024 | Aguilar | G02B 21/0048 |

FOREIGN PATENT DOCUMENTS

| | | | | | |
|---|---|---|---|---|---|
| DE | 10 2013 108 457 | A1 | | 4/2014 | |
| DE | 10 2015 209 410 | A1 | | 11/2016 | |
| JP | H10-318733 | A | | 12/1998 | |
| JP | 2003-161889 | A | | 6/2003 | |
| JP | 2012-530267 | A | | 11/2012 | |
| JP | 2013-020083 | A | | 1/2013 | |
| JP | 2016-510108 | A | | 4/2016 | |
| JP | 2020-531856 | A | | 11/2020 | |
| JP | 2021-081446 | A | | 5/2021 | |
| KR | 20110121461 | A | * | 11/2011 | G01B 11/255 |
| WO | WO-9738341 | A1 | * | 10/1997 | G01B 11/306 |
| WO | WO-9844375 | A2 | * | 10/1998 | G02B 21/008 |
| WO | 2010/145669 | A1 | | 12/2010 | |
| WO | 2012/083967 | A1 | | 6/2012 | |
| WO | 2014/125037 | A1 | | 8/2014 | |
| WO | WO-2016193037 | A1 | * | 12/2016 | G01B 11/24 |
| WO | WO-2021019136 | A1 | * | 2/2021 | G01N 21/956 |
| WO | 2021/140396 | A1 | | 7/2021 | |
| WO | WO-2024012878 | A1 | * | 1/2024 | G01B 11/026 |

OTHER PUBLICATIONS

International Search Report in PCT/EP2022/079294, mailed Feb. 6, 2023.

M. Noguchi, S.K. Nayar, "Microscopic Shape from Focus Using a Projected Illumination Pattern", Mathematical and Computer Modelling, vol. 24, Issues 5-6 (1996), pp. 31-48, ISSN 0895-7177, https://doi.org/10.1016/0895-7177(96)00114-8, total of 18 pages.

German Office Action dated May 3, 2021 in German Application No. 10 2020 005 943.0, with English translation of relevant parts.

German Office Action dated Oct. 27, 2022 in German Application No. 10 2021 128 444.9, with English translation of relevant parts.

Konfokaltechnik (Confocal technology) in: Wikipedia, the free Encyclopedia. Last edited on: Jul. 12, 2021 at 12:59, URL: https://de.wikipedia.org/wiki/Konfokaltechnik [retrieved on Oct. 27, 2022], with English translation.

Japanese Office Action in Japanese Application No. 2024-526879 dated Jul. 7, 2026 with English translation of Office Action Summary.

* cited by examiner b)

METHOD FOR OPTICALLY MEASURING TECHNICAL SURFACES, AND DEVICE FOR CARRYING OUT THE METHOD

CROSS REFERENCE TO RELATED APPLICATIONS

This application is the National Stage of PCT/EP2022/079294 filed on Oct. 20, 2022, which claims priority under 35 U.S.C. § 119 of German Application No. 10 2021 128 444.9 filed on Nov. 2, 2021. The international application under PCT article 21(2) was not published in English.

The invention relates to a method for optically measuring technical surfaces using a confocal sensor. Light of a light source (11) is directed onto a sample surface to be measured via an optical system, said optical system containing an illumination mask (13), a sensor matrix (15), a beam splitter (14) for combining an illumination beam path and a detection beam path, and imaging optics (6), wherein the illumination mask (13) consists of transparent regions (1) and non-transparent or slightly transparent regions (2) arranged in a checkerboard pattern, and the pitch (3) of the pattern on the illumination mask (13) corresponds to the pixel pitch (24) of the sensor matrix (15). The illumination mask (13) and the sensor matrix (15) are adjusted relative to each other such that the transparent regions (1) and the pixels of the sensor matrix (15) are simultaneously sharply imaged onto the sample (7) by means of the imaging optics (6), whereby the sharp image of the illumination mask (13) is then sharply imaged onto the sensor matrix (15) so that a checkerboard pattern of light and dark illuminated pixels is produced on the sensor matrix.

The invention also relates to a device for carrying out the method.

BACKGROUND

Until now, it has been common practice to realize planar confocal imaging by combining illumination and detection using a beam splitter and then inserting the confocal filter. This is, for example, a rotating multipinhole disk (Nipkow disk), a fixed pinhole pattern with pinholes, a microlens array or a combination of microlens array and pinhole pattern or rotating multipinhole disk. The transparency of the confocal filter can be specifically increased using the microlenses, but the manufacturing process for this solution is technologically demanding and the microlenses can have a negative impact on the optical imaging quality of the overall system.

Confocal filters without microlenses usually have a transparency of less than 5%, which is why very powerful light sources must be used and disturbing light reflections often occur in the device in front of the confocal filter. In addition to the frame rate of the camera, the speed of the system is limited by the required illumination intensity for sufficient modulation of the camera signal and the maximum speed of a synchronously running multipinhole disk.

PRIOR ART

Methods according to the preamble of claim 1 and corresponding devices are known from the following publications:

WO 2014/125 037 A1
WO 2012/083 967 A1
WO 2010/145 669 A1.

M. Noguchi M., S. K. Nayar S. K., "Microscopic shape from focus using a projected illumination pattern", Mathematical and Computer Modelling, Volume 24, Issues 5-6 (1996), Pages 31-48, ISSN 0895-7177, https://doi.org/10.1016/0895-7177 (96) 00114-8
U.S. Pat. No. 6,229,913 B1
DE 10 2015 209 410 A1.

In this prior art, the transparent regions of the illumination mask are angular.

If a pinhole pattern with rectangular transparent regions according to FIG. 2 is used as a confocal filter as an illumination mask, direction-dependent diffraction effects occur in the illumination. When capturing images of textured surfaces, these lead to local asymmetries in light intensity when focusing through the surface. Depending on the orientation, this favors the formation of spikes and excessive roughness of the determined 3D surface. This can be demonstrated experimentally by carrying out several measurements of the same surface region at different angles of rotation around the optical axis and comparing the results.

Object and Solution of the Invention

The object of the invention is that of eliminating the above-mentioned direction-dependent diffraction effects.

This object is achieved in the method of the type mentioned at the outset, in accordance with the invention, in that the transparent regions (1) of the illumination mask (13) are round.

Advantages of the Invention

The following advantages, inter alia, are achieved:

In order to eliminate the direction-dependent artifacts, pinhole patterns with round transparent regions according to FIG. 3 are proposed. This eliminates the directional dependence of the diffraction effects on the individual pinholes, resulting in the desired symmetrical-round Airy patterns on the sample.

This invention reduces the implementation of confocal surface detection to the essential elements, significantly increases the optical transparency of the overall system, and removes the previous limitation of the practically realizable measuring speed.

Advantageous embodiments of the invention are specified in the dependent claims.

It is therefore proposed that there are no imaging optics either between the illumination mask (13) and the beam splitter (14) or between the camera sensor and the beam splitter (14).

It is further proposed that the imaging optics (6) focus through the sample (7) during the acquisition of an image stack of confocal images, the position of the respective focus position being included in the determination of the z-positions of the intensity maxima.

In order to capture a 3D image, depending on the desired resolution, an image stack typically containing 20 to 1,000 images is captured while the focus is moved continuously in the Z-direction through the sample or, correspondingly, the sample is moved through the focus. The subsequent capture of the image stack then takes place either in the reverse scanning direction or in the same direction, the focus being moved back to its original position as quickly as possible beforehand. The intensity curve for each pixel is evaluated from the recorded image stacks.

It is further proposed that the camera sensor is a monochromatic sensor, the intensity values of the "dark" pixels corresponding to the non-transparent or slightly transparent regions (2) of the illumination mask (13) being first inverted and then the Z-position of the intensity maxima being determined, or the height values for the slightly transparent regions of the illumination mask (13) being interpolated from the height values of the neighboring pixels.

If a monochromatic sensor matrix (black and white camera) is used, in the case of neighboring pixels, in each case an intensity signal with an intensity maximum or minimum in the focus is generated in the recorded image stack. In both cases, their height position $z_0$ can be determined algorithmically, e.g. using the center of gravity algorithm. In the case of pixels with intensity minimum in the focus, the intensity values are first inverted and the height position $z_0$ is determined analogously to the pixels with intensity maximum.

The additional evaluation of the pixels with intensity minimum in the focus has the advantage that the normally discarded data are also used to calculate the 3D result. This means that twice as much raw data are included in the calculation of the overall 3D result as in the usual evaluation of only the pixels with maximum intensity. In the case of suitable post-evaluation, the noise figure can in this way be reduced to 70.7% of the original value (1/root N), with identical hardware. Since both partial images determined from intensity maxima/minima in each case are based on fundamentally different basic information due to the different origin, more valid measurement data can be determined by a suitable combination of both results of neighboring pixels, especially in sample regions with low reflection. This improves the quality and the data density of the 3D results.

Alternatively, the height positions $z_0$ of the pixels with intensity minimum can also be determined by interpolating the height values of neighboring pixels. The determined height position is output for each individual pixel.

The speed of data evaluation can be almost doubled as a result.

FIG. 4*a* shows the intensity signal of a pixel for pixels onto which the highly transparent regions of the illumination mask are imaged, and FIG. 4*b* shows the intensity signal of a pixel onto which the slightly transparent regions of the illumination mask are imaged.

It is further proposed that the camera sensor is a color sensor with a Bayer pattern, the "bright" pixels corresponding to the transparent regions (1) of the illumination mask (13) being the green pixels (21) and the z-position of the intensity maximum being determined for these pixels, and that the height values for the red pixels (23) and blue pixels (22) are interpolated from the height values of the neighboring green pixels (21).

If a white light source, e.g. a white LED, is used as the light source, and a color sensor matrix with the Bayer pattern shown in FIG. 5, the device is adjusted so that the transparent regions of the illumination mask correspond to the green pixels of the sensor matrix. This means that only the green pixels are illuminated in the focus, while the differently colored pixels are "dark". The height position of the intensity maxima is then determined in each case for the green pixels and interpolated for the differently colored pixels in between.

A known problem in the 3D evaluation of adjacent pixels of different colors is a vertical shift of the determined height position depending on the wavelength. This leads to a checkerboard-like pattern in the 3D result, when all pixels are displayed.

The exclusive use of the "green" pixels for 3D evaluation has the advantage that neither wavelength-dependent interactions between light and the sample surface, nor chromatic aberrations of the imaging optics, lead to visible artifacts in the 3D result.

It is further proposed that, when generating the colored intensity image, the color information for the red pixels (23) and blue pixels (22) is determined from the intensity values just outside the focus.

In the focus, the intensity of the red and blue pixels is reduced due to the confocal effect according to FIG. 4*b*. In order to achieve a correct color determination despite this, the intensity is measured just outside the focus, where the blur is a few pixels and the intensity signal is not yet reduced by the confocal effect.

The intensity value in the respective focus is used for the green pixels.

It is further proposed for the calculation of the Z-position of the intensity maxima to already begin during the measurement data acquisition, the calculation of the Z-position of the intensity maxima being carried out using parallelized algorithms.

The confocal evaluation is carried out during the acquisition of the image stack. In this case, each image is transferred to the graphics card and evaluated there in parallel. This means that the resulting 3D image is already available, displayable and storable during the acquisition of the ensuing image stack, as a result of which the latency time for obtaining the result after the image stack has been acquired is typically less than the time required to acquire it.

Likewise, the resources used for data evaluation are free again once the 3D image has been calculated, so that the next 3D calculation can be started immediately afterwards and the image acquisition does not have to be interrupted.

This means that a 3D frame rate of 20 Hz can be achieved when using a fast camera system, for example having a frame rate of 800 Hz and recording 40 images per image stack. This allows 3D images to be continuously displayed and saved at video frequency without any waiting time between the recording of two 3D images. If the sample surface to be measured is moved continuously at a constant speed during measurement data acquisition, a defined distorted 3D image is created, which can be corrected by a speed-related 3D calibration in a post-processing algorithm.

EMBODIMENT

An embodiment of the invention is described in more detail below with reference to drawings. In all the drawings, the same reference signs have the same meaning and are therefore only explained once where appropriate.

In the figures:

FIG. 1*a* shows the basic confocal beam path with a lambda-quarter retardation plate in a first position, FIG. 1*b* shows the basic confocal beam path with a lambda-quarter retardation plate in a second position, FIG. 2 shows an illumination mask having rectangular transparent regions arranged in a checkerboard pattern (comparative example), FIG. 3 shows an illumination mask having round transparent regions arranged in a checkerboard pattern, according to the invention FIG. 4 shows the intensity when focusing through the sample, and FIG. 5 shows the Bayer pattern of a color sensor matrix with a Bayer pattern.

FIGS. 1*a* and 1*b* show the basic confocal beam path: A light source (11) illuminates an illumination mask (13) via a collimator (12). Said mask is imaged through the beam splitter (14) onto a sample (7) to be measured, using imaging optics (6). The sample is imaged through the beam splitter onto a sensor matrix (15), using the imaging optics. When the sample is in focus, the pattern is imaged sharply onto the sample and this image is imaged sharply onto the sensor matrix. The beam splitter (14) may have a beam-splitting coating (26), A lambda-quarter retardation plate (27) may be located between the beam splitter (14) and the sample (7).

Figure 1A:
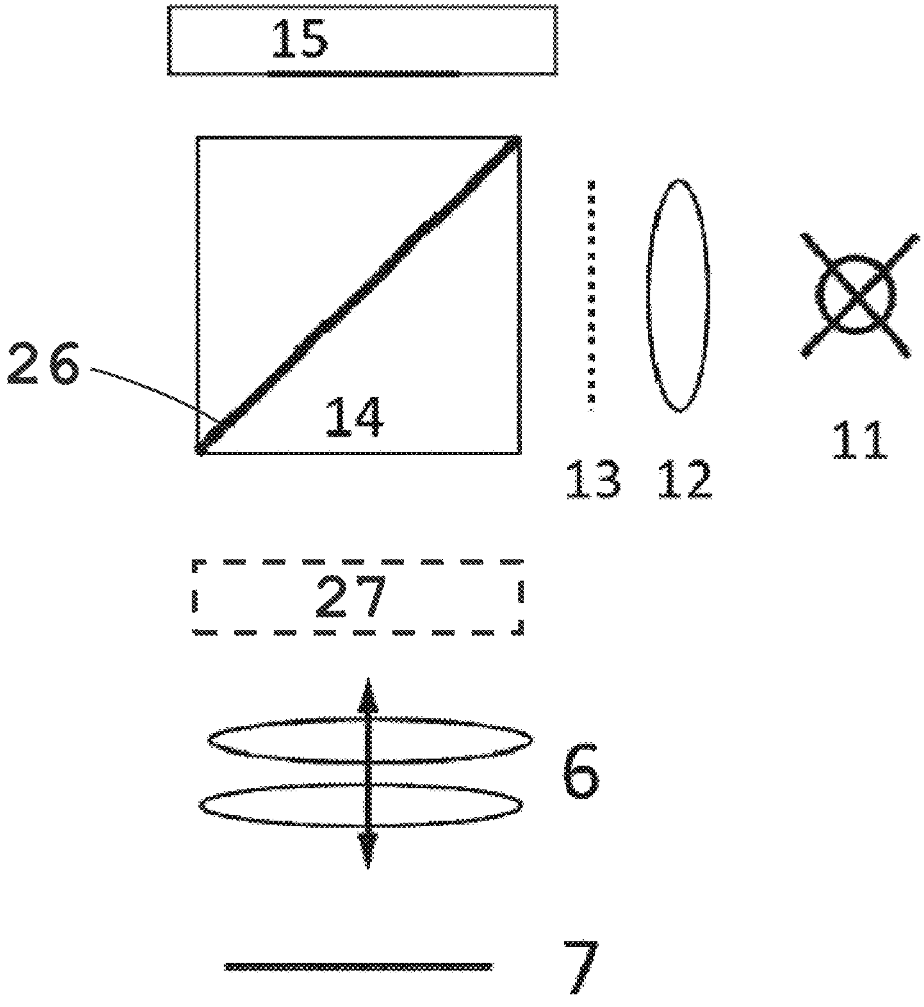
Figure 1B:
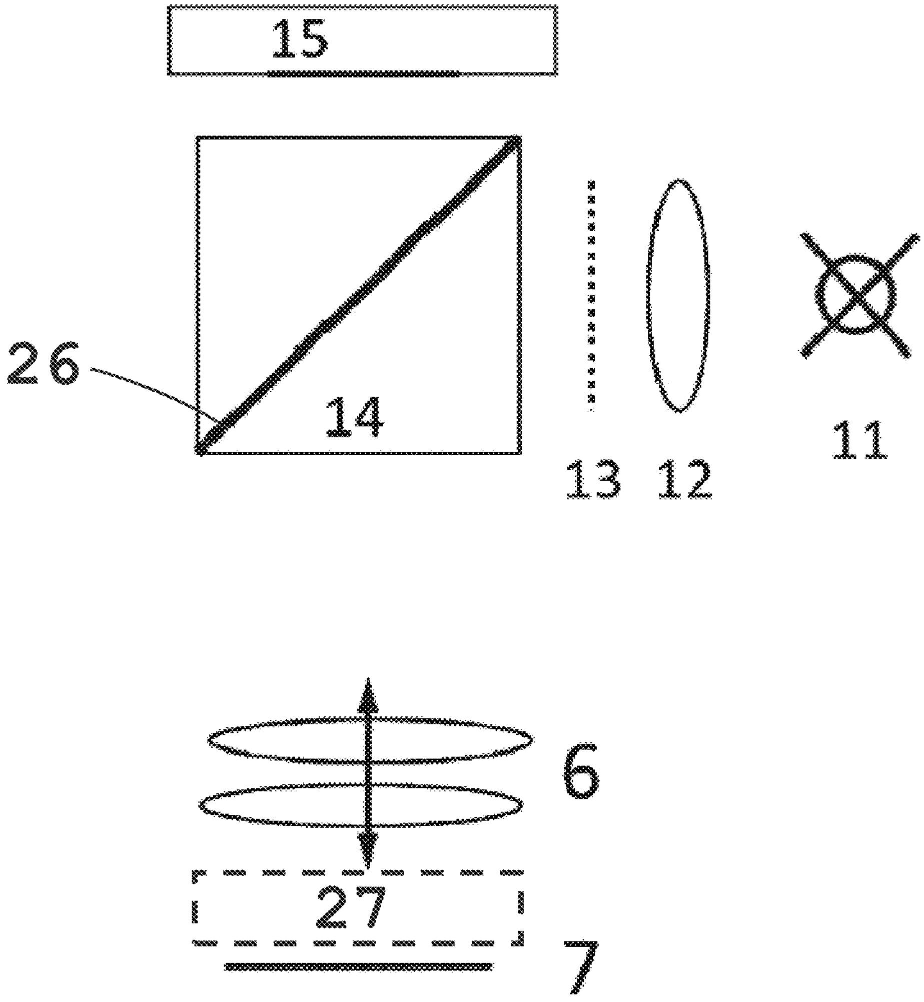
Figure 2:
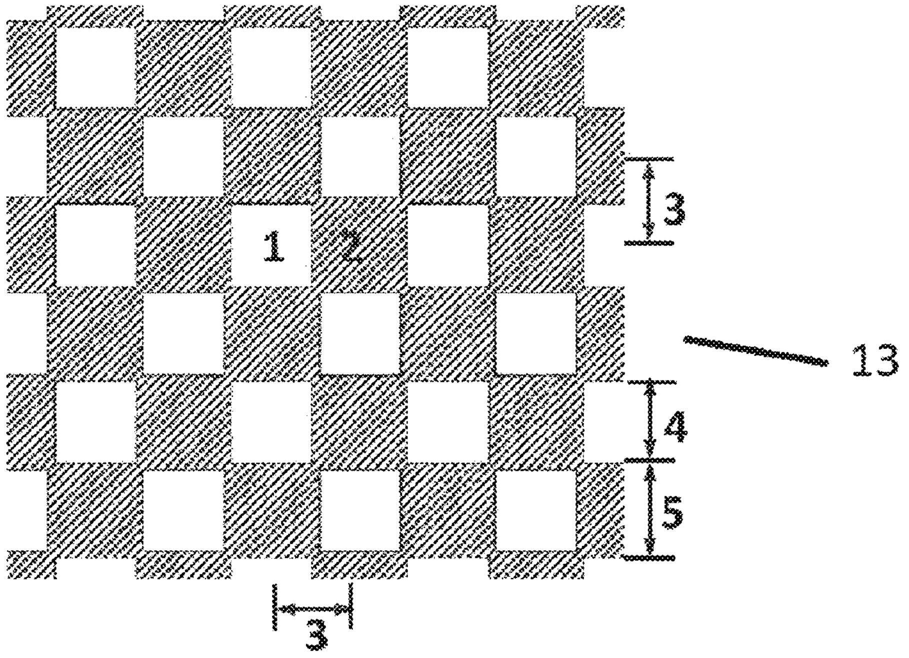
FIG. 2 shows an illumination mask having rectangular transparent regions arranged in a checkerboard pattern: The transparent regions (1) with the edge length (4) are arranged between the slightly transparent regions (2) with the edge length (5) as in a checkerboard pattern with a pitch (3) corresponding to the pixel pitch (24) of the sensor matrix.
Figure 3:
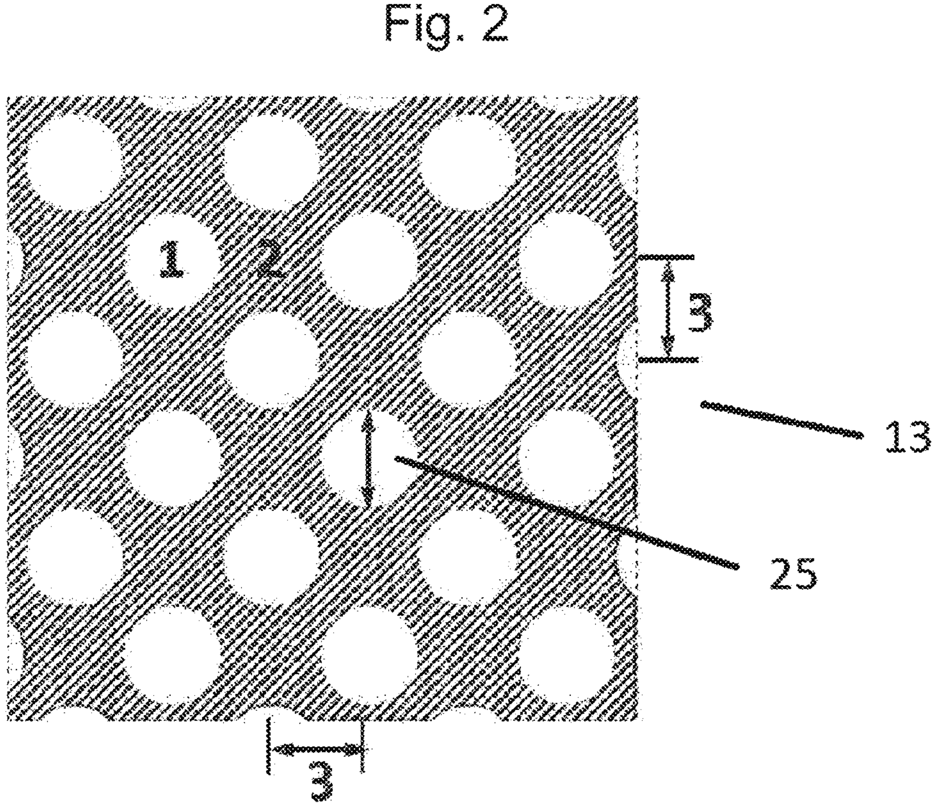
FIG. 3 shows an illumination mask having round transparent regions arranged in a checkerboard pattern: The transparent regions (1) with the diameter (25) are arranged between the slightly transparent regions (2) as in a checkerboard pattern with a pitch (3) corresponding to the pixel pitch (24) of the sensor matrix.
Figure 4A:
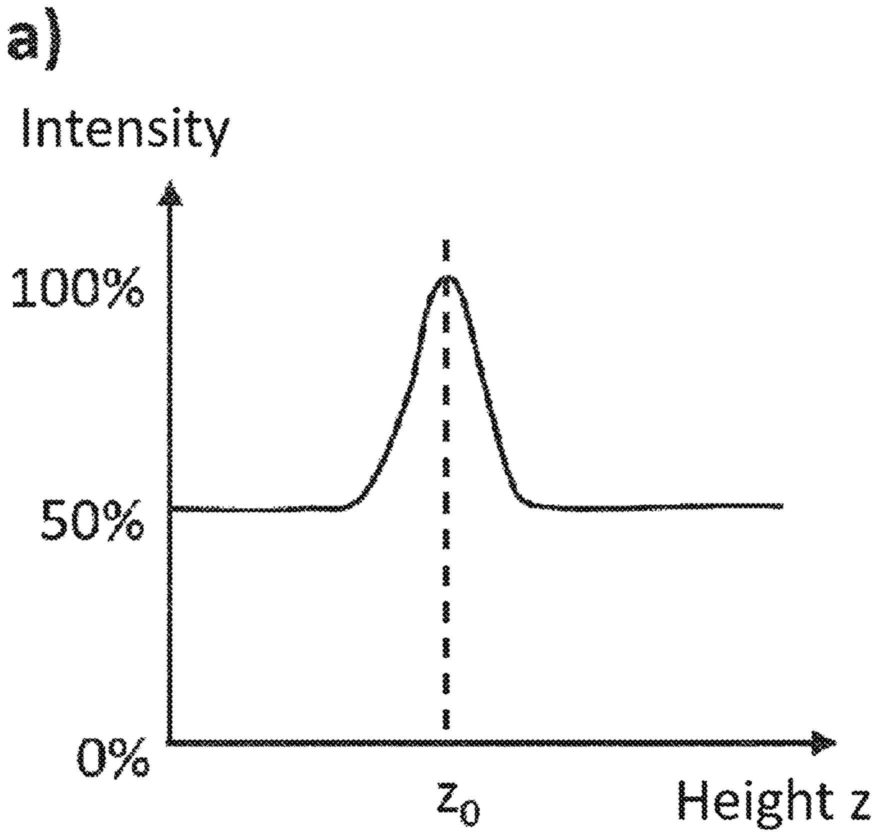
FIG. 4 shows the intensity when focusing through the sample: a) For the "bright" pixels, there is an increase in intensity in the region of the focus ($z_0$) during the height scan, and b) for the other pixels, there is a reduction in intensity in the focus ($z_0$). The Z-position $z_0$ for the respective extreme value is determined.
Figure 4B:
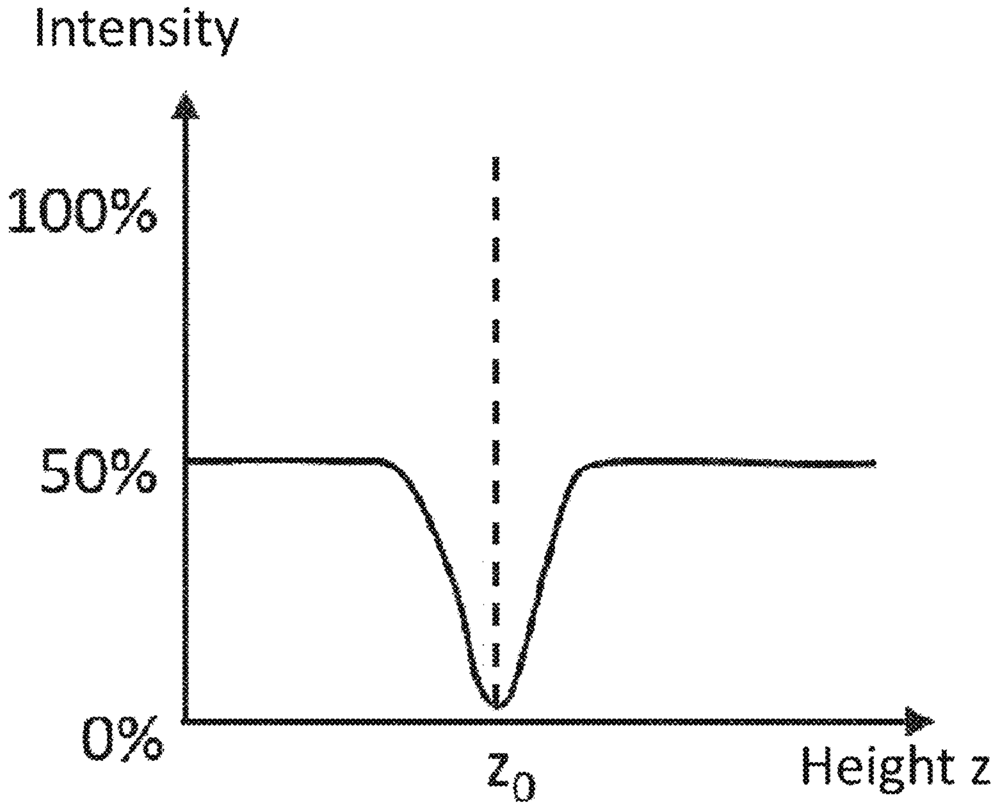
Figure 5:
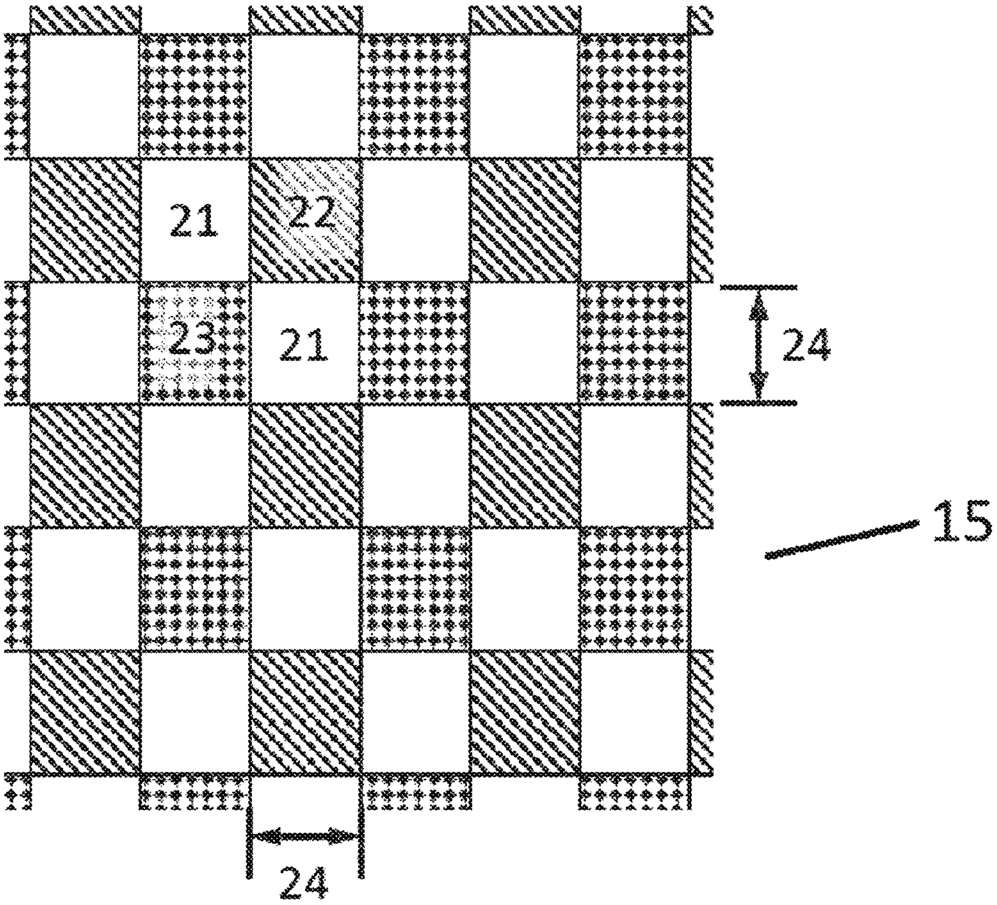
FIG. 5 shows the Bayer pattern of a color sensor matrix with Bayer pattern: The blue pixels (22) and the red pixels (23) are located between the green pixels (21), which are arranged diagonally in a checkerboard manner and have a pixel pitch (24) that corresponds to the pitch (3) of the illumination mask.

Mode of Operation of the Method According to the Invention for Optically Measuring Technical Surfaces The mode of operation of the method according to the invention for optically measuring technical surfaces is explained in detail below:

FIG. 1 shows the basic structure of the invention. A light source (1) is collimated by means of a collimator and illuminates a fixedly installed illumination mask (13) that serves as a confocal filter and has a pinhole pattern (see FIG. 2 and FIG. 3). The pitch of the pinhole pattern corresponds to the pixel pitch of the sensor matrix (15). The illumination light is reflected in the direction of the sample by means of a beam splitter (14) and focused on the surface of a sample (7) by means of imaging optics (6). When the sample is in focus, the illumination mask (13) is imaged sharply on the sample. In the detection beam path, the surface of the sample (7) is imaged onto the sensor matrix (15) by means of imaging optics (6), through the beam splitter (14). When the sample is in focus, the pinhole pattern of the illumination mask that is sharply imaged onto the sample is sharply imaged onto the sensor matrix. If the sample surface is outside the focus region, the pinhole pattern becomes so blurred that it is no longer recognizable there.

This structure can also be realized in such a way that the illumination optics (11) to (13) and sensor matrix (15) are swapped, i.e. the illumination takes place in transmission through the beam splitter, while the sensor matrix is arranged in reflection.

LIST OF REFERENCE SIGNS

1 transparent region
2 slightly transparent region, non-transparent region
3 pitch of the illumination mask
4 edge length
5 edge length
6 imaging optics
7 sample
11 light source
12 collimator
13 illumination mask
14 beam splitter
15 sensor matrix
21 green pixels
22 blue pixels
23 red pixels
24 pixel pitch of the sensor matrix
25 diameter
26 beam-splitting coating
27 lambda-quarter retardation plate

The invention claimed is:

1. A method for optically measuring technical surfaces using a confocal sensor, the method comprising the steps of:

providing an optical system containing an illumination mask, a sensor matrix, a beam splitter for combining an illumination beam path and a detection beam path, and imaging optics, wherein the illumination mask consists of transparent regions and non-transparent or slightly transparent regions arranged in a checkerboard pattern, and a pitch of the checkerboard pattern on the illumination mask corresponds to a pixel pitch of the sensor matrix, directing light of a light source onto a sample surface of a sample to be measured with the optical system, adjusting the illumination mask and the sensor matrix relative to each other such that the transparent regions and pixels of the sensor matrix are simultaneously sharply imaged onto the sample by the imaging optics, whereby a sharp image of the illumination mask is then sharply imaged onto the sensor matrix so that a checkerboard pattern of light and dark illuminated pixels is produced on the sensor matrix, and focusing the imaging optics through the sample during an acquisition of an image stack of confocal images, and including a position of a respective focus position in a determination of z-positions of intensity maxima, wherein the transparent regions of the illumination mask are round.

2. The method for optically measuring technical surfaces according to claim 1, wherein there are no imaging optics either between the illumination mask and the beam splitter or between the confocal sensor and the beam splitter.

3. The method for optically measuring technical surfaces the method according to claim 1, wherein the confocal sensor is a monochromatic sensor, the intensity values of the "dark" pixels correspond to the non-transparent or slightly transparent regions of the illumination mask which are first inverted and then a Z-position of an intensity maxima is determined, or height values for the slightly transparent regions of the illumination mask are interpolated from height values of neighboring pixels.

4. The method for optically measuring technical surfaces according to claim 1, wherein the confocal sensor is a color sensor with a Bayer pattern, "bright" pixels corresponding to the transparent regions of the illumination mask are green pixels, and a z-position of an intensity maximum is determined for these pixels.

5. The method for optically measuring technical surfaces according to claim 1, wherein height values for red pixels and blue pixels are interpolated from height values of neighboring green pixels.

6. The method for optically measuring technical surfaces according to claim 1, wherein when generating a colored intensity image, a color information for red pixels and blue pixels is determined from intensity values outside of focus.

7. The method for optically measuring technical surfaces according to claim 1, wherein a calculation of a Z-position of an intensity maxima already begins during a measurement data acquisition.

8. The method for optically measuring technical surfaces according to claim 1, wherein the sample surface to be measured is moved continuously at a constant speed during measurement data acquisition, so that a defined distorted 3D image is created, which is corrected by a speed-related 3D calibration in a post-processing algorithm.

9. A device for carrying out the method according to claim 1, said device containing a beam splitter plate, a beam splitter cuboid or a beam splitter cube as the beam splitter, wherein a beam-splitting coating has a polarization-neutral splitting ratio or has a polarizing effect, and a lambda-quarter retardation plate is located between the beam splitter and the sample in the case of a polarizing effect, which lambda-quarter retardation plate rotates a polarization direction of the reflected light by 90 degrees.

* * * * *